US010230260B2

(12) United States Patent
Cairoli et al.

(10) Patent No.: US 10,230,260 B2
(45) Date of Patent: Mar. 12, 2019

(54) FAST UTILITY DISCONNECT SWITCH FOR SINGLE CONVERSION UPS

(71) Applicant: ABB Schweiz AG, Baden (CH)

(72) Inventors: Pietro Cairoli, Raleigh, NC (US); Hongrae Kim, Cary, NC (US); Nicholas James Elliot, Hawke's Bay (NZ); Simon Walton, Hawke Bay (NZ)

(73) Assignee: ABB Schweiz AG, Baden (CH)

( * ) Notice: Subject to any disclaimer, the term of this patent is extended or adjusted under 35 U.S.C. 154(b) by 305 days.

(21) Appl. No.: 14/862,790

(22) Filed: Sep. 23, 2015

(65) Prior Publication Data
US 2017/0085121 A1    Mar. 23, 2017

(51) Int. Cl.
*H02J 9/06*    (2006.01)
(52) U.S. Cl.
CPC .......... *H02J 9/061* (2013.01); *H02J 2009/068* (2013.01)
(58) Field of Classification Search
CPC .......... H02J 9/068; H02H 3/087; H02H 9/021; H02H 9/005; H01H 71/10; H01H 9/542
USPC ................ 307/64, 113; 361/13, 19
See application file for complete search history.

(56) References Cited

U.S. PATENT DOCUMENTS

| 3,573,550 A * | 4/1971 | Baker, Jr. ............... H02H 3/066 327/465 |
| 3,668,483 A | 6/1972 | Kellenbenz |
| 4,177,479 A | 12/1979 | DeBruyne et al. |
| 4,203,040 A | 5/1980 | Abbondanti et al. |
| 4,492,975 A | 1/1985 | Yamada et al. |
| 4,713,720 A | 12/1987 | Rogers et al. |
| 5,142,163 A | 8/1992 | Hase |
| 5,170,310 A | 12/1992 | Studtmann et al. |
| 5,210,685 A | 5/1993 | Rosa |
| 5,561,579 A | 10/1996 | Gyugyi et al. |
| 5,686,768 A | 11/1997 | Thomsen et al. |

(Continued)

FOREIGN PATENT DOCUMENTS

| CN | 1547305 | 11/2004 |
| CN | 202917995 U | 1/2013 |

(Continued)

OTHER PUBLICATIONS

Ohshima, M., 'Development of uninterruptible secondary battery system using thyristor switches', International Conference on Power Electronic Drives and Energy Systems for Industrial Growth, 1998.

(Continued)

*Primary Examiner* — Dinh T Le
(74) *Attorney, Agent, or Firm* — J. Bruce Schelkopf; Taft Stettinius & Hollister LLP

(57) ABSTRACT

One embodiment is a uninterruptable power supply (UPS) system including a utility disconnect switch (UDS) coupled with an input line and an output line and structured to selectably connect and disconnect the input line and the output line. The UDS includes a semiconductor switching device connected between the input line and the output line, a surge arrester coupled in parallel with the semiconductor switching device, a dynamic voltage balancing device and a static voltage balancing device which are coupled in parallel with the semiconductor switching device.

29 Claims, 5 Drawing Sheets

(56) References Cited

U.S. PATENT DOCUMENTS

| | | | | |
|---|---|---|---|---|
| 5,754,045 | A | * | 5/1998 | Higuchi .............. H02J 3/00 323/237 |
| 5,770,897 | A | | 6/1998 | Bapat et al. |
| 5,898,582 | A | | 8/1999 | Denis et al. |
| 6,104,106 | A | | 8/2000 | Partridge |
| 6,160,689 | A | | 12/2000 | Stolzenberg |
| 6,166,456 | A | * | 12/2000 | Gruning .............. H02J 9/06 307/116 |
| 6,215,202 | B1 | * | 4/2001 | Luongo .............. H02J 15/00 307/23 |
| 6,768,223 | B2 | | 7/2004 | Powell et al. |
| 6,879,053 | B1 | | 4/2005 | Welches et al. |
| 7,405,910 | B2 | | 7/2008 | Maitra et al. |
| 7,800,248 | B2 | | 9/2010 | Krämer et al. |
| 8,080,900 | B2 | | 12/2011 | Corhodzic et al. |
| 8,094,435 | B2 | | 1/2012 | Howes et al. |
| 8,742,628 | B2 | | 6/2014 | Urciuoli |
| 8,853,887 | B2 | | 10/2014 | Silberbauer et al. |
| 8,891,209 | B2 | * | 11/2014 | Hafner .............. H01H 9/541 361/13 |
| 9,065,326 | B2 | * | 6/2015 | Hafner .............. H02M 1/092 |
| 9,184,003 | B2 | * | 11/2015 | Crane .............. H02H 3/087 |
| 2002/0011752 | A1 | | 1/2002 | Powell et al. |
| 2003/0227785 | A1 | | 12/2003 | Johnson, Jr. |
| 2007/0121257 | A1 | | 5/2007 | Maitra et al. |
| 2010/0277006 | A1 | | 11/2010 | Urciuoli |
| 2012/0119581 | A1 | | 5/2012 | Silberbauer et al. |
| 2013/0222958 | A1 | | 8/2013 | Fu et al. |
| 2014/0021887 | A1 | | 1/2014 | Keily et al. |
| 2014/0097680 | A1 | | 4/2014 | Navarro |
| 2014/0209415 | A1 | | 7/2014 | Hall |

FOREIGN PATENT DOCUMENTS

| | | |
|---|---|---|
| CN | 104078992 A | 10/2014 |
| CN | 10259809 B | 3/2015 |
| JP | S5721130 A | 3/1982 |
| WO | 9203866 | 3/1992 |

OTHER PUBLICATIONS

Meyer, Christoph et al., "Novel Solid-State Circuit Breaker Based on Active Thyristor Topologies", 35th Annual IEEE Power Electronic Specialists Conference, Aachen, Germany, 2004, pp. 2559-2564.

Kagan, N., et al., "Evaluating the Risk of Equipment Disruption Related to Voltage Sags", IEEEIPES Transmission 8 Distribution Conference & Exposition: Latin America, 2004.

Wang, J. ; Chen, S. : Lie, T.T., "Estimating economic impact of voltage sags", International Conference on Power System Technology, 2004.

Cheng, Po-Tai, et al. "Design of an impulse commutation bridge for teh solid-state transfer switch", Center for Advanced Power Technologies, Department of Electrical Engineering, 2005, pp. 1024-1031.

Meyer, C. et al., "Solid-state circuit breaker based on active thyristor topologies", IEEE Transaction on power electronics, vol. 21, No. 2, 2006.

Nissin Electric, "Voltage Dip / Power Blackout Compensator", Presentation PQ Products TMEIC MPC—Multiple Power Compensator, TMEIC brochure, 2009.

Nakano, T., et al., "Development of a Small, High-performance, Voltage Sag Compensator COMPACT for High Voltage Users", The 2010 International Power Electronics Conference (IPEC), 2010.

Casey, L.F., et al., "Power devices for grid connections", 24th International Symposium on Power Semiconductor Devices and ICs (ISPSD), 2012.

Forero, J. et al., "Decision making methodology based on expert systems for minimizing economic impact of voltage sags in industrial power systems", IEEE Grenoble PowerTech (POWERTECH), 2013.

TMEIC MPC—Multiple Power Compensator, TMEIC brochure, 2009.

TMEIC MPC—Multiple Power Compensator, TMEIC brochure, 2009, English translation.

International Search Report for corresponding PCT Application No. PCT/US16/53257, dated Dec. 15, 2016, 2 pages.

* cited by examiner

FAST UTILITY DISCONNECT SWITCH FOR SINGLE CONVERSION UPS

BACKGROUND

The present application relates generally to a utility disconnect switch (UDS) and more particularly but not exclusively to a fast utility disconnect switch for a single conversion uninterruptable power supply (UPS). The ability of a UPS to transfer between a primary power supply (e.g., a utility grid) and a back-up power supply (e.g., battery, capacitors and related interface converter) without influencing production quality and losses is a challenge for a number of industrial systems and process. Furthermore, the ability to transfer from grid power to a back-up power supply very quickly, e.g., in 1 ms or less, would be desirable in certain applications. Present approaches to UPS transitions between a primary power supply and a backup power supply, such as thyristor-based or silicon controlled rectifier (SCR)-based systems, fail to adequately meet these challenges and suffer from a number of additional drawbacks and shortcomings. There is a significant need for the unique apparatuses, methods and systems disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

One embodiment is a unique power supply system including a utility disconnect switch (UDS) coupled with an input line and an output line and structured to selectably connect and disconnect the input line and the output line. In certain forms the UDS includes a semiconductor switching device connected between the input line and the output line, a surge arrester coupled in parallel with the semiconductor switching device, a dynamic voltage balancing device and a static voltage balancing device which are coupled in parallel with the semiconductor switching device. Further embodiments, forms, objects, features, advantages, aspects, and benefits shall become apparent from the following description and drawings.

DETAILED DESCRIPTION OF ILLUSTRATIVE EMBODIMENTS

Figure 1:
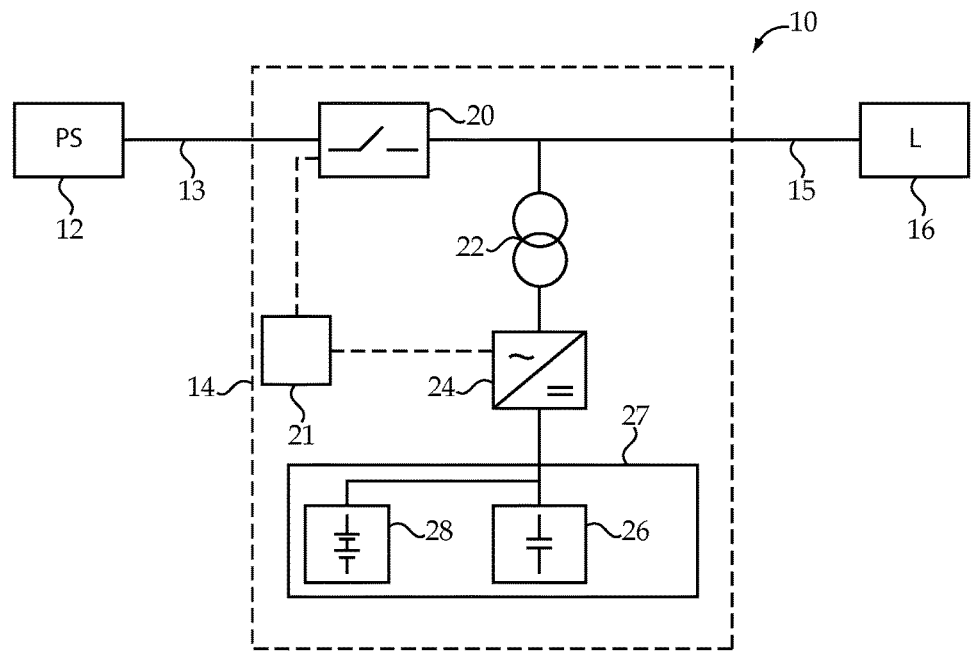
FIG. 1 is a schematic block diagram illustrating an exemplary uninterruptable power supply (UPS) system.

With reference to FIG. 1 there is illustrated a schematic block diagram of an exemplary power supply system 10. In the illustrated embodiment, system 10 includes an uninterruptable power supply (UPS) 14 which is structured as a single conversion (off-line, or line interactive) medium voltage UPS system. It shall be appreciated that system 10 and UPS 14 may also be provided in a variety of other forms with differing capacities, classes, configurations, and/or voltage ranges.

UPS 14 is coupled with an input line 13 and an output line 15. Input line 13 is coupled with a primary power supply 12 such as a utility power grid or other type of power supply. Output line 15 is coupled with an output load 16. UPS 14 includes a utility disconnect switch (UDS) 20 that is operatively with input line 13 and output line 15, a coupling transformer 22 which is operatively coupled with output line 15, an inverter 24 which is operatively coupled with coupling transformer 22, and a backup power supply 27 which is operatively coupled with inverter 24. In the illustrated embodiment backup power supply 27 includes one or more ultracapacitors 26 and one or more batteries 28, it being appreciated that different forms of backup power supply elements are contemplated. UPS 14 further includes a controller 21 which is operatively coupled with UDS 20 and inverter 24 and is structured to monitor information associated therewith and provide control signals thereto. It shall be appreciated that controller 21 may be provided as a single controller or multiple controllers structured to sense information of and control various elements of UPS 14 including, for example, UDS 20 and inverter 24.

UDS 20 is structured to selectably connect and disconnect power supply 12 and input line 13 from the other elements of system 10. Controller 21 may control UDS 20 to disconnect from power supply 12 and input line 13 in the event of a voltage perturbation, bad power quality, and/or faults on side of the power supply 12 or input line 12. Controller 21 may also control inverter 24 to supply power to output line 15 once UDS 20 disconnects form power supply 12 and input line 13 and to control inverter 24 to provide power to output load 16 until the power supply 12 is back within the nominal specifications.

UDS 20 may be provided in a number of different forms. In certain preferred forms UDS 20 allows system 10 to system to transfer power substantially instantaneously, e.g., within 1 ms or less, when a fault occur without waiting for favorable grid and load conditions. In certain preferred forms UDS 20 comprises combinations of modules that permit easier implementation for different voltages and currents, scalability, and redundancy.

Certain preferred forms of UDS 20 comprise one or more modules which include one or more semiconductor switching devices, one or more energy absorption devices, one or more voltage clamping devices, one or more static voltage balancing devices, and one or more dynamic voltage balancing devices, and which may also include or be used in connection with one or more mechanical switching devices. It shall be appreciated that the devices disclosed herein may comprise combinations of multiple circuit elements or multiple devices and are not restricted to a single circuit element or a single device unless specifically so stated.

The semiconductor switching devices preferably include one or more controlled turn off devices which may be, but need not always be, provided in combination with one or more diodes. The controlled turn off devices preferably comprise Integrated Gate-Commutated Thyristor (IGCT) devices or Reverse Blocking IGCT (RB-IGCT) devices. The controlled turn off devices may also comprise include Reverse Conducting IGCT (RC-IGCT) devices, Insulated-Gate Bipolar Transistor (IGBT) devices, Bimode Insulated Gate Transistor (BIGT) devices, Metal Oxide Semiconductor Field-Effect Transistor (MOSFET) devices, Field-Effect Transistor (FET) devices, Junction gate Field-Effect Transistor (JFET), High-Electron-Mobility Transistor HEMT devices, or Wide-Band Gap (SiC, GaN, Diamond) devices. When present, the diodes preferably comprise standard recovery diodes or fast recovery diodes, and may also comprise Pn diodes, Schottky diodes, SiC Schottky diodes and other types of diodes.

The energy absorption devices preferably comprise surge arresters such as metal oxide varistors, zinc oxide varistors or other types of varistors. The energy absorption devices are preferably structured such that energy stored in the system at the moment of opening UDS 20 is dissipated within one or more modules of UDS 20 by the energy absorption devices. The energy absorption devices may be structured in a variety of configurations and relationships relative to individual circuit elements or multiple circuit elements. In certain forms the energy absorption devices are structured in parallel relationships with respective individual semiconductor switching devices, in parallel relationships with groups of multiple semiconductor switching devices, in series relationships with one or more semiconductor switching devices, or combinations of the foregoing and other circuit topologies.

The voltage clamping devices preferably comprise surge arresters such as metal oxide varistors, zinc oxide varistors or other types of varistors. The voltage clamping devices may comprise the same devices as the energy absorption devices or separate devices may be provided for energy dissipation and voltage clamping. At the time of opening the voltage is clamped to a certain level by one or more modules of UDS 20, generating a specific voltage that determines the opening time and the voltage sharing among modules when multiple modules are present. Furthermore, the maximum opening time of UDS 20 can be selected by design allowing a specified performance of opening and power transfer. The voltage clamping devices may be structured in a variety of configurations and relationships relative to individual circuit elements or multiple circuit elements. In certain forms voltage clamping devices are structured in parallel relationships with respective individual semiconductor switching devices, in parallel relationships with groups of multiple semiconductor switching devices, in series relationships with one or more semiconductor switching devices, or combinations of the foregoing and other circuit topologies.

The static voltage balancing devices preferably comprise resistors, capacitors and/or diodes structured to balance or distribute static voltages across one or more circuit elements. The dynamic voltage balancing devices preferably comprise resistors, capacitors and/or diodes structured to balance or distribute dynamic voltages across one or more circuit elements. The static voltage balancing devices and dynamic voltage balancing devices may be structured in a variety of configurations and relationships relative to individual circuit elements or multiple circuit elements. In certain forms static voltage balancing devices and dynamic voltage balancing devices are structured in parallel relationships with respective individual semiconductor switching devices, in parallel relationships with groups of multiple semiconductor switching devices, in series relationships with one or more semiconductor switching devices, or combinations of the foregoing and other circuit topologies.

The mechanical switching devices preferably comprise mechanical contactors, and may also comprise mechanical breakers, mechanical disconnect switches, sectionalizer switches, or other types of mechanical switches. The mechanical switching devices may be provided in series with one or more UDS modules and may be positioned at the input of one or more modules, the output of one or more modules, both the input and output of one or more modules, between modules or combinations thereof.

It shall be appreciated that the devices described above in connection with UDS 20 may be provided in a variety of modules comprising a number of different configurations and forms. Several exemplary modules suitable for use in UDS 20 are illustrated in with FIGS. 2-5 and shall now be described in further detail.

Figure 2:
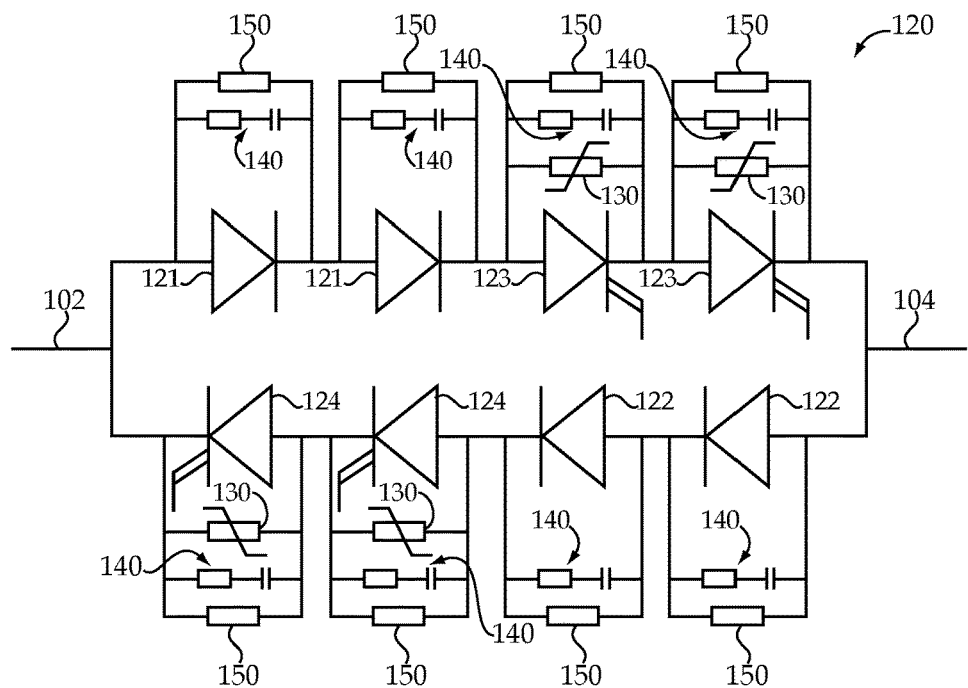
FIGS. 2-5 are circuit diagrams illustrating exemplary utility disconnect switch (UDS) modules.

With reference to FIG. 2 there is illustrated an exemplary circuit diagram of a UDS module 120 comprising diodes 121 and IGCT devices 123 structured in an anti-parallel relationship with diodes 122 and IGCT devices 124 between input 102 and output 104. Varistor-type surge arresters 130 are provided in parallel with IGCT devices 123 and 124 and are structured to provide energy absorption and voltage clamping. Dynamic voltage balancing devices 140 (which comprises a snubber circuit including a resistor and a capacitor connected in series) and static voltage balancing devices 150 (which comprise a balancing resistor) are coupled in parallel with diodes 121 and 123 and IGCT devices 122 and 124 and are structured to provide dynamic voltage balancing and static voltage balancing, respectively. When IGCT devices 123 are turned on current can flow in a forward direction from input 102 to output 104 through diodes 121 and IGCT devices 123. When IGCT devices 124 are turned on current can flow in a reverse direction from output 104 to input 102 through diodes 122 and IGCT devices 124. Commands may be sent from a controller, such as controller 21, to selectively turn off IGCT devices 123 and 124 in order to disconnect input 102 of UDS module 120 from output 104 and to selectively turn on IGCT devices 123 and 124 in order connect input 102 of UDS module 120 from output 104. In certain preferred forms this connection and disconnection occurs within 1 ms or less. It shall be appreciated that a mechanical switching element may also be provided in series with input 102 and/or output 104 in order to reduce transient loads imposed on other circuit elements and mitigate wear thereof.

Figure 3:
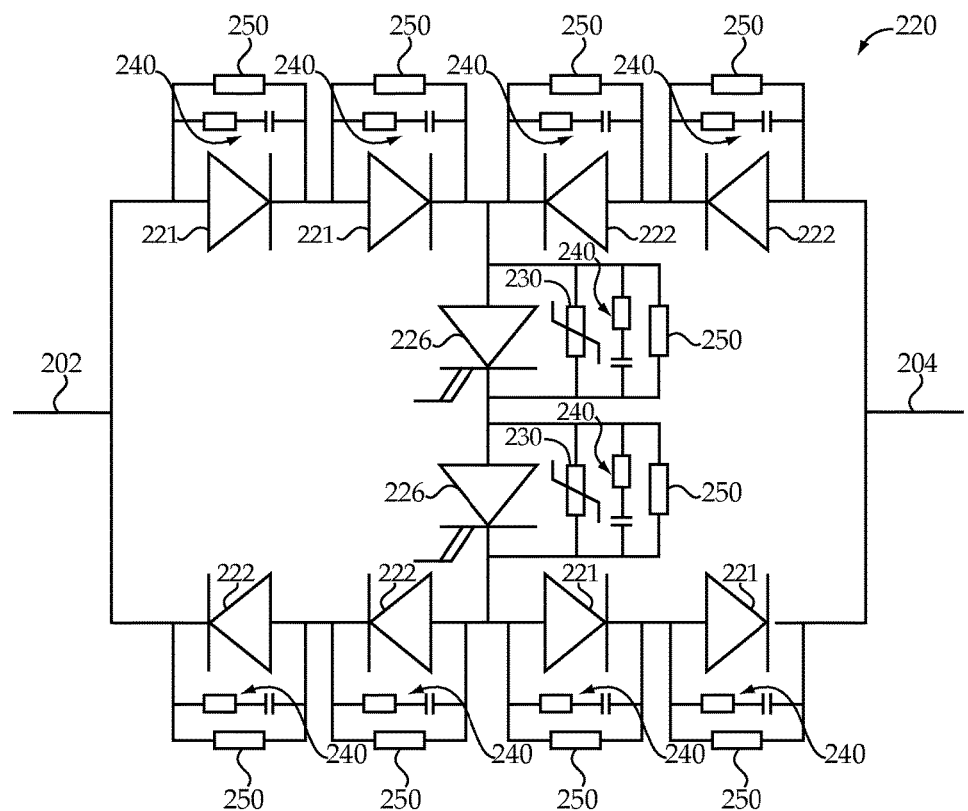

With reference to FIG. 3 there is illustrated an exemplary circuit diagram of a UDS module 220 comprising diodes 221, diodes 222, and IGCT devices 226 in a series relationship with both diodes 221 and diodes 222 to provide forward and reverse current pathways between input 202 and output 204. Varistor-type surge arresters 230 are provided in parallel with IGCT devices 226 and are structured to provide energy absorption and voltage clamping. Dynamic voltage balancing devices 240 (which comprises a snubber circuit including a resistor and a capacitor connected in series) and static voltage balancing devices 250 (which comprise a balancing resistor) are coupled in parallel with diodes 221 and 223 and IGCT devices 226 and are structured to provide dynamic voltage balancing and static voltage balancing, respectively. When IGCT devices 226 are turned on current can flow in a forward direction from input 202 to output 204 through diodes 221 and IGCT devices 223 as well as in a reverse direction from output 204 to input 202 through diodes 222 and IGCT devices 226. Commands may be sent from a controller, such as controller 21, to selectively turn off IGCT devices 226 in order to disconnect input 202 of UDS module 220 from output 204 and to selectively turn on IGCT devices 226 in order connect input 202 of UDS module 220 from output 204. In certain preferred forms this connection and disconnection preferably occurs within 1 ms or less. It shall be appreciated that a mechanical switching element may also be provided in series with input 202 and/or output 204.

Figure 4:
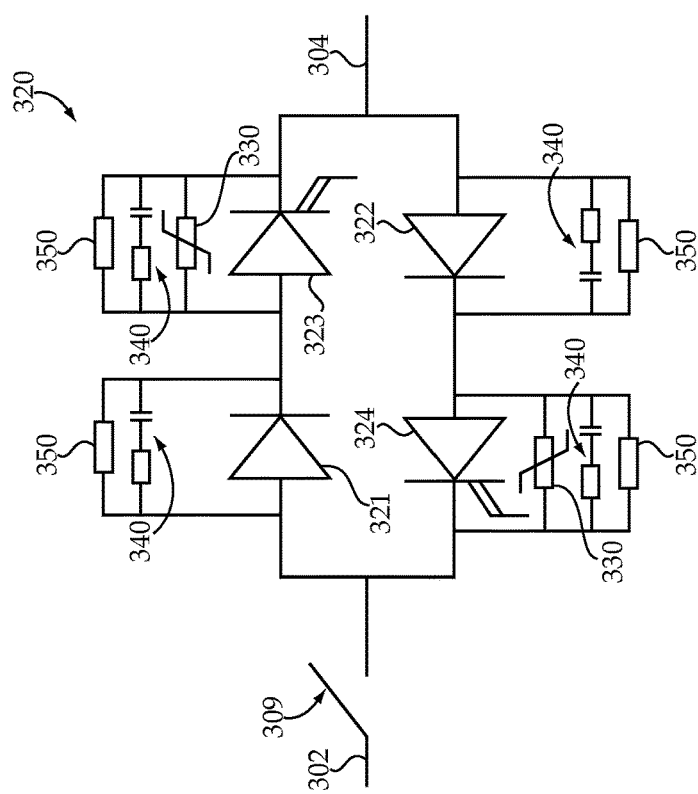

With reference to FIG. 4 there is illustrated an exemplary circuit diagram of a UDS module 320 comprising diode 321 and IGCT device 323 structured in an anti-parallel relationship with diode 322 and IGCT device 324 between input 302 and output 304. Module 320 further includes a mechanical switching element 309 coupled in series with input line 302 it being understood that certain forms may omit mechanical switching element 309. Varistor-type surge arresters 330 are provided in parallel with IGCT devices 323 and 324 and are structured to provide energy absorption and voltage clamping. Dynamic voltage balancing devices 340 (which comprises a snubber circuit including a resistor and a capacitor connected in series) and static voltage balancing devices 350 (which comprise a balancing resistor) are coupled in parallel with diodes 321 and 323 and IGCT devices 322 and 324 and are structured to provide dynamic voltage balancing and static voltage balancing, respectively. When IGCT device 323 is turned on and mechanical switching element 309 is closed current can flow in a forward direction from input 302 to output 304 through diode 321 and IGCT device 323. When IGCT device 324 is turned on and mechanical switching element 309 is closed current can flow in a reverse direction from output 304 to input 302 through diode 322 and IGCT device 324. Commands may be sent from a controller, such as controller 21, to selectively turn off IGCT devices 323 and 324 in order to disconnect input 302 of UDS module 320 from output 304 and to selectively turn on IGCT devices 323 and 324 in order connect input 302 of UDS module 320 from output 304. In certain preferred forms this connection and disconnection preferably occurs within 1 ms or less. Mechanical switching element 309 can be controlled to selectably open and close in conjunction with the turning on and turning off of IGCT devices 323 and 324 in order to avoid or limit overvoltages due to system events such as phase shift between input and output of UDS module 320 and fault to ground on one side of UDS module 320. It shall be further appreciated that a mechanical switching element can also be utilized in connection with output 304 as well as with the inputs and/or outputs of other UDS modules disclosed herein including, for example, UDS modules 120 and 220 described above, and UDS module 420 described below.

Figure 5:
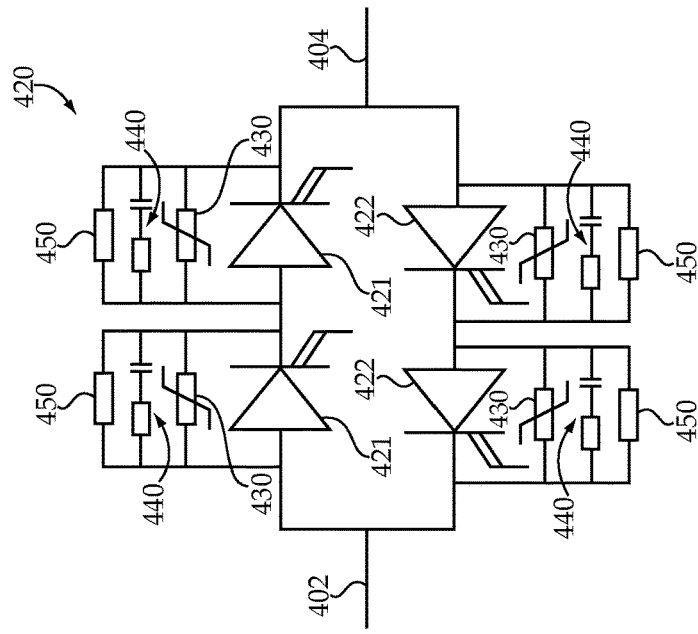

With reference to FIG. 5 there is illustrated an exemplary circuit diagram of a UDS module 420 comprising RB-IGCT devices 423 structured in an anti-parallel relationship with RB-IGCT devices 424 between input 402 and output 404. Varistor-type surge arresters 430 are provided in parallel with RB-IGCT devices 423 and 424 and are structured to provide energy absorption and voltage clamping. Dynamic voltage balancing devices 440 (which comprises a snubber circuit including a resistor and a capacitor connected in series) and static voltage balancing devices 450 (which comprise a balancing resistor) are coupled in parallel with RB-IGCT devices 422 and 424 and are structured to provide dynamic voltage balancing and static voltage balancing, respectively. When RB-IGCT devices 423 are turned on current can flow in a forward direction from input 402 to output 404 through diodes 421 and RB-IGCT devices 423. When RB-IGCT devices 424 are turned on current can flow in a reverse direction from output 404 to input 402 through diodes 422 and RB-IGCT devices 424. Commands may be sent from a controller, such as controller 21, to selectively turn off RB-IGCT devices 423 and 424 in order to disconnect input 402 of UDS module 420 from output 404 and to selectively turn on RB-IGCT devices 423 and 424 in order connect input 402 of UDS module 420 from output 404. In certain preferred forms this connection and disconnection preferably occurs within 1 ms or less. It shall be appreciated that a mechanical switching element may also be provided in series with input 402 and/or output 404.

It shall be appreciated that a number of combinations, modifications and variations on the exemplary embodiments illustrated in FIGS. 2-5 are contemplated. For example, the IGCT devices and diodes and/or the RB-IGCT devices may alternatively be others types of semiconductor switching devices such as the additional controlled turn off devices described above. The number of semiconductor switching devices may also vary. Certain exemplary UDS modules may include as few as a single semiconductor device provided in generally in the configuration illustrated in FIG. 3. Certain exemplary UDS modules may include greater numbers of redundantly positioned semiconductor switching devices, for example, additional switching devices may be connected in series in addition to the two device series groupings illustrated in FIGS. 2-5. It shall be further appreciated that multiple UDS modules may also be combined and interconnected to provide a multi-module UDS. Illustrative examples of multi-module UDS devices shall now be described in connection with FIGS. 6-8.

Figure 6:
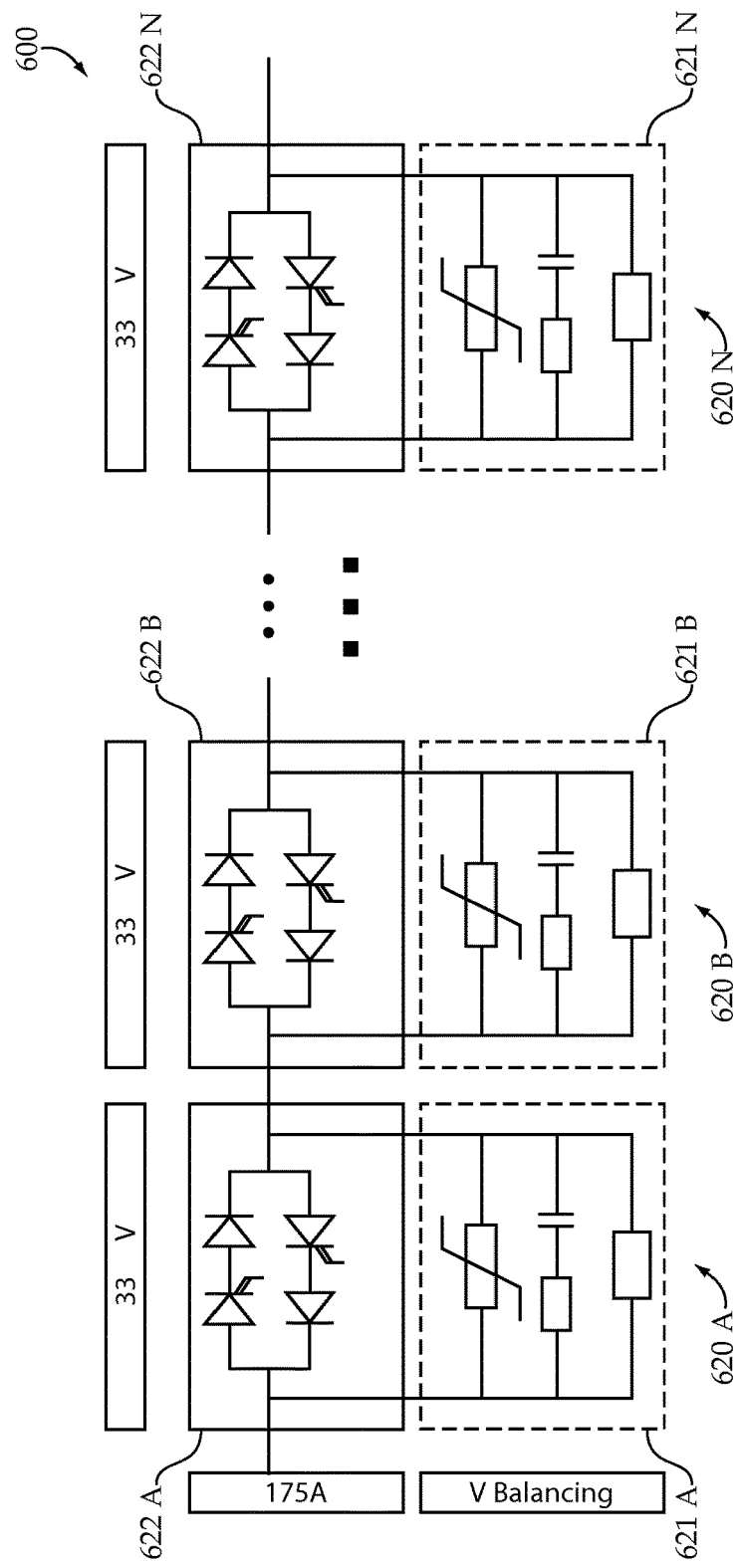
FIGS. 6-8 are schematic block diagrams illustrating exemplary combinations of multiple UDS modules.

With reference to FIG. 6 there is illustrated an exemplary multi-module UDS 600 in which a plurality of UDS modules 620A through 620N are connected in series. Modules 620A, 620B through 620N include respective semiconductor switching element component 622A, 622B through 622N which may include the same or similar components as the modules illustrated in FIGS. 2-5 or the described changes, modifications and variations thereof. Modules 620A, 620B through 620N further include respective voltage balancing components 621A, 621B through 621N which include surge suppresser and voltage clamping devices, dynamic voltage balancing devices and static voltage balancing devices. In the illustrated example of series connected modules, the voltage balancing components are structured to include the following elements: a voltage surge arrester (e.g. MOV) structured to provide maximum overvoltage clamping (inductive current interruption) and also limit the maximum voltage across a module in case of voltage unbalances during opening, an RC snubber circuit structured to limit overvoltages during transient voltage balance at turn-on and turn-off, and during dynamic unbalances among UDS modules, and a static balancing resistor structured to provide static voltage balance for respective semiconductor switching devices in case of voltage unbalances when the semiconductor switching devices are open.

It shall be appreciated that the number of modules in multi-module UDS 600 may vary from as few as two to as many as ten or more it being appreciated that numbers greater than ten modules may be utilized. It shall be further appreciated that mechanical switching devices may be provided intermediate one or more modules of multi-module UDS 600. Additionally, it shall be understood that voltage balancing devices may be structured to balance voltage across the semiconductor switching devices, the mechanical switching devices or both. It shall be further understood that the illustrated voltages (3300V) and amperages (175 A) are non-limiting examples and that a variety of other voltages and amperages may be utilized.

Figure 7:
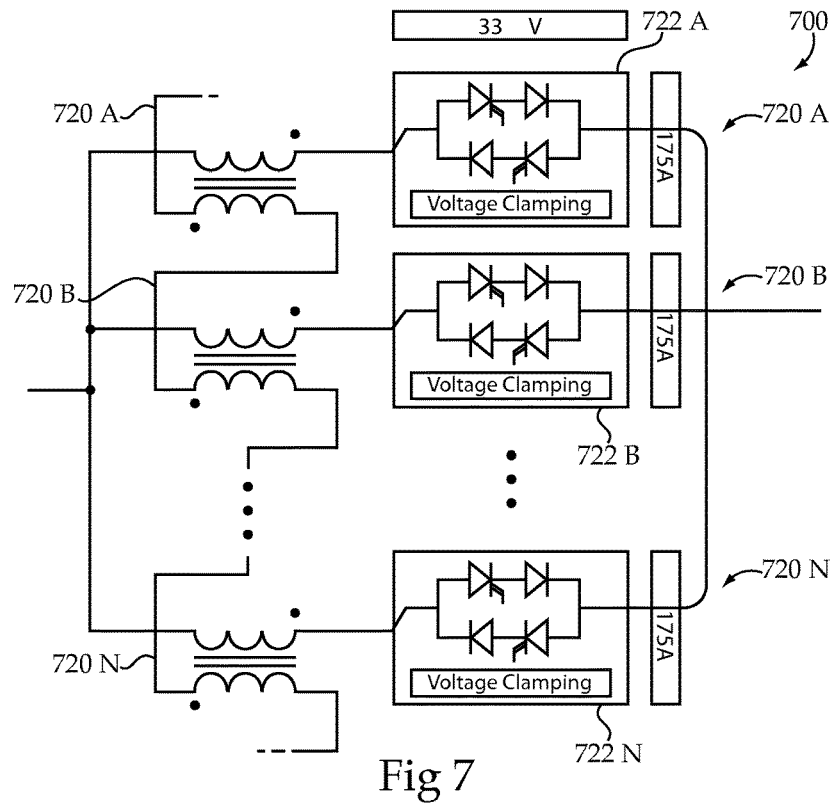

With reference to FIG. 7 there is illustrated an exemplary multi-module UDS 700 in which a plurality of UDS modules 720A through 720N are connected in parallel. Modules 720A, 720B through 720N include respective semiconductor switching elements 722A, 722B through 722N which may include the same or similar components as the modules illustrated in FIGS. 2-5 or the described changes, modifications and variations thereof. Modules 720A, 720B through 720N further include respective current balancing components 721A, 721B through 721N which include cross-coupled reactors in certain preferred embodiments but may also include series resistances and inductances. In the illustrated example of parallel connected modules, the current balancing components are structured so that the reactors generate opposite voltages to balance current sharing among devices with different forward voltage drop and further provide both static and dynamic current balancing. It shall be understood that the illustrated voltages (3300V) and amperages (175 A) are non-limiting examples and that a variety of other voltages and amperages may be utilized.

Figure 8:
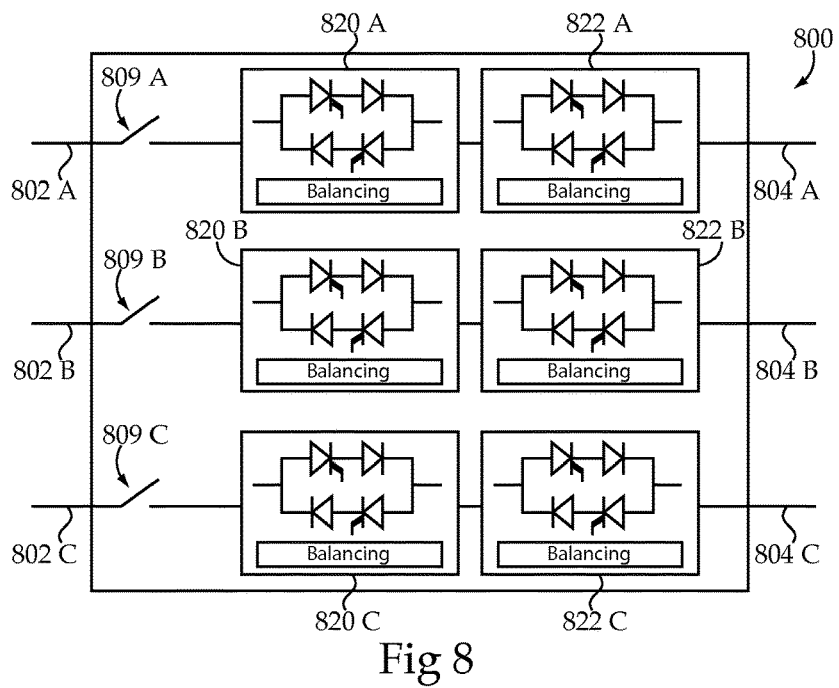

With reference to FIG. 8 there is illustrated an exemplary multi-module UDS 800 for a three phase system. UDS 800 includes a first phase leg including input 802A, mechanical switching device 809A, UDS modules 820A and 822A which may include the devices and components discussed above, and output line 804A. UDS 800 further includes a second phase leg including input 802B, mechanical switching device 809B, UDS modules 820B and 822B which may include the devices discussed above, and output line 804B. UDS 800 further includes a third phase line including input 802C, mechanical switching device 809C, UDS modules 820C and 822C which may include the devices discussed above, and output line 804C. In certain further embodiments where disconnection of two of the three phase legs is effective to disconnect the third, the UDS elements of one the three phase legs may be omitted in favor of a continuous line. It shall be appreciated that additional multi-phase embodiments may include a greater or lesser number of phase legs.

A number further exemplary embodiments shall now be described. One exemplary embodiment is a UPS power supply system comprising: an input line structured to receive electric power from a power grid; an output line structured to provide electric power to a load; a secondary power supply operatively coupled with the output line; a utility disconnect switch (UDS) coupled with the input line and the output line and structured to selectably connect and disconnect the input line and the output line, the UDS including a UDS module comprising: a semiconductor switching device connected between the input line and the output line, a surge arrester coupled in parallel with the semiconductor switching device, a dynamic voltage balancing device coupled in parallel with the semiconductor switching device, and a static voltage balancing device coupled in parallel with the semiconductor switching device.

In certain forms of the foregoing embodiment the semiconductor switching device comprises one of an integrated gate-commutated thyristor (IGCT) and a reverse blocking integrated gate-commutated thyristor (RB-IGCT). In certain forms the dynamic voltage balancing device comprises an RC snubber. In certain forms the static voltage balancing device comprises a static balancing resistor. In certain forms the UDS further comprises a diode connected in series with the semiconductor switching device, a second static voltage device circuit coupled in parallel with the diode and a second dynamic voltage balancing device coupled in parallel with the diode. In certain forms the surge arrestor comprises a varistor structured to provide energy absorption and voltage clamping for the semiconductor switching device. In certain forms the UDS comprises a plurality of semiconductor switching devices connected between the input line and the output line, a plurality of surge arresters coupled in parallel with respective ones of the semiconductor switching device, a plurality of a dynamic voltage balancing devices coupled in parallel with respective ones the semiconductor switching device, and a plurality of static voltage balancing devices coupled between the input line and the output line. In certain forms at least two of the plurality of semiconductor switching devices are connected in an anti-parallel relationship between the input line and the output line. Certain forms further comprise a plurality of diodes, a first one of said diodes connected in series with a first one of the semiconductor switching devices, and a second one of said diodes connected in series with a second one of the semiconductor switching devices, the second one of the semiconductor switching devices being in an anti-parallel configuration with the first one of the semiconductor switching devices. In certain forms at least two of the plurality of semiconductor switching devices are connected in a series relationship between the input line and the output line. Certain forms further comprise a plurality of UDS modules connected in a series relationship and voltage balancing circuitry connected in parallel with the UDS modules. Certain forms further comprise a plurality of UDS modules connected in a parallel relationship and current balancing circuit connected in parallel with the plurality of UDS modules. Certain forms further comprise a mechanical switch coupled in a series relationship with one of the input line and the output line. In certain forms the secondary power supply comprises: an AC/DC converter including an AC side and a DC side, the AC side being operatively coupled to the output line, and an energy storage device operatively coupled to the DC side of the AC/DC converter, the energy storage device structured to store energy based upon DC power received from the AC/DC converter and provide DC power to the DC side of the AC/DC converter. In certain forms the secondary power supply comprises: an AC/AC converter including a first AC side and a second AC side, the first AC side being operatively coupled to the output line, and an energy storage device operatively coupled to the second AC side of the AC/AC converter, the energy storage device structured to store energy based upon AC power received from the AC/ADC converter and provide AC power to the second AC side of the AC/AC converter.

Another exemplary embodiment is a utility disconnect switch comprising: an input structured to receive electric power from a utility power source; an output structured to provide electric power to a load; a first current flow path permitting current flow in a first direction from the input to the output; and a second current flow path permitting current flow in a second direction from the output to the input; wherein the first current flow path and the second current flow path each include a plurality of semiconductor switching devices and corresponding sets of passive devices coupled in parallel with respective ones of the semiconductor switching devices and structured to provide energy absorption and voltage clamping when the semiconductor switching devices are turned off to open the utility disconnect switch, and to provide static and dynamic voltage balancing across the semiconductor switching devices.

In certain forms of the foregoing embodiment the sets of passive devices comprise a surge arrester structured to provide energy absorption and voltage clamping, an RC snubber structured to provide dynamic voltage balancing, and a balancing resistor structured to provide static voltage balancing. In certain forms the plurality of semiconductor switching devices are common to both the first current flow path and the second current flow path. In certain forms the first current flow path comprises a first set of the plurality of semiconductor switching devices and the second current flow path comprises a second set of the plurality of semiconductor switching devices structured in an anti-parallel relationship relative to the first set. In certain forms the first current flow path and the second current flow path each include a plurality of diodes connected in series with the plurality of semiconductor switching devices. Certain forms further comprise a plurality of RC snubbers coupled in parallel corresponding ones of the plurality of diodes and a plurality of balancing resistor coupled in parallel with corresponding ones of the plurality of diodes. In certain forms the utility disconnect switch is provided in an uninterruptable power supply including an input line connected to the utility disconnect switch, and output line connected to the utility disconnect switch, and a secondary power supply connected to the output line.

Another exemplary embodiment is a method comprising: operating a power supply system comprising an input line structured to receive electric power from a utility, an output line structured to provide electric power to a load, a backup power supply operatively coupled with the output line, and a utility disconnect switch (UDS) coupled with the input line and the output line and structured to selectably connect and disconnect the input line from the output line; controlling the UDS to open a semiconductor switching device effective to disconnect the input line from the output line; arresting a voltage surge in the UDS during the act of controlling; clamping a maximum voltage of the USD to a maximum voltage during the act of controlling the UDS; balancing a static voltage across the semiconductor switching device during the act of controlling the UDS; and balancing a dynamic voltage across the semiconductor switching device during the act of controlling the UDS. In certain forms the acts of arresting a voltage surge and clamping a maximum voltage of the USD are performed by a single device. In certain forms the single device comprises a varistor coupled in parallel with the semiconductor switching device. In certain forms the act of balancing a static voltage across the semiconductor switching device is performed by a balancing resistor coupled in parallel with the semiconductor switching device. In certain forms the act of balancing a dynamic voltage across the semiconductor switching device is performed by an RC snubber coupled in parallel with the semiconductor switching device. In certain forms the act of controlling the UDS to open a semiconductor switching device comprises controlling to the UDS to open a plurality of semiconductor switching devices. In certain forms the acts of arresting a voltage surge, clamping a maximum voltage, balancing a static voltage, and balancing a dynamic voltage are performed for each of the plurality of semiconductor switching devices.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A UPS power supply system comprising:
   an input line structured to receive electric power from a power grid;
   an output line structured to provide electric power to a load;
   a secondary power supply operatively coupled with the output line;
   a utility disconnect switch (UDS) coupled with the input line and the output line and structured to selectably connect and disconnect the input line and the output line, the UDS including a UDS module comprising:
   a first current path coupled between the input line and the output line and including a first plurality of semiconductor devices coupled each including an anode and cathode, wherein each of the first plurality of semiconductor devices is coupled together anode to cathode,
   a second current path coupled in parallel with the first current path and including a second plurality of semiconductor devices each including an anode and cathode and wherein each of the second plurality of semiconductor devices is coupled together anode to cathode,
   wherein the first current path includes:
   a semiconductor switching device connected between the input line and the output line,
   a surge arrester coupled in parallel with the semiconductor switching device,
   a dynamic voltage balancing device coupled in parallel with the semiconductor switching device, and
   a static voltage balancing device coupled in parallel with the semiconductor switching device.

2. The system of claim 1 wherein the semiconductor switching device comprises one of an integrated gate-commutated thyristor (IGCT) and a reverse blocking integrated gate-commutated thyristor (RB-IGCT).

3. The system of claim 1 wherein the dynamic voltage balancing device comprises an RC snubber.

4. The system of claim 1 wherein the static voltage balancing device comprises a static balancing resistor.

5. The system of claim 1 wherein the UDS further comprises a diode connected in series with the semiconductor switching device, a second static voltage device circuit coupled in parallel with the diode and a second dynamic voltage balancing device coupled in parallel with the diode.

6. The system of claim 1 wherein the surge arrestor comprises a varistor structured to provide energy absorption and voltage clamping for the semiconductor switching device.

7. The system of claim 1 wherein the UDS comprises
   a plurality of semiconductor switching devices connected between the input line and the output line,
   a plurality of surge arresters coupled in parallel with respective ones of the semiconductor switching device,
   a plurality of a dynamic voltage balancing devices coupled in parallel with respective ones the semiconductor switching device, and
   a plurality of static voltage balancing devices coupled between the input line and the output line.

8. The system of claim 7 wherein at least two of the plurality of semiconductor switching devices are connected in an anti-parallel relationship between the input line and the output line.

9. The system of claim 7 further comprising a plurality of diodes, a first one of said diodes connected in series with a first one of the semiconductor switching devices, and a second one of said diodes connected in series with a second one of the semiconductor switching devices, the second one of the semiconductor switching devices being in an anti-parallel configuration with the first one of the semiconductor switching devices.

10. The system of claim 7 wherein at least two of the plurality of semiconductor switching devices are connected in a series relationship between the input line and the output line.

11. The system of claim 1 further comprising a plurality of UDS modules connected in a series relationship and voltage balancing circuitry connected in parallel with the UDS modules.

12. The system of claim 1 further comprising a plurality of UDS modules connected in a parallel relationship and current balancing circuit connected in parallel with the plurality of UDS modules.

13. The system of claim 1 further comprising a mechanical switch coupled in a series relationship with one of the input line and the output line.

14. The system of claim 1 wherein the secondary power supply comprises:
an AC/DC converter including an AC side and a DC side, the AC side being operatively coupled to the output line, and
an energy storage device operatively coupled to the DC side of the AC/DC converter, the energy storage device structured to store energy based upon DC power received from the AC/DC converter and provide DC power to the DC side of the AC/DC converter.

15. The system of claim 1 wherein the secondary power supply comprises:
an AC/AC converter including a first AC side and a second AC side, the first AC side being operatively coupled to the output line, and
an energy storage device operatively coupled to the second AC side of the AC/AC converter, the energy storage device structured to store energy based upon AC power received from the AC/ADC converter and provide AC power to the second AC side of the AC/AC converter.

16. A utility disconnect switch comprising:
an input structured to receive electric power from a utility power source;
an output structured to provide electric power to a load;
a first current flow path coupled between the input and the output and permitting current flow in a first direction from the input to the output, the first current flow path including a first plurality of semiconductor switching devices, each including an anode and a cathode, wherein each of the first plurality of semiconductor switching devices is coupled together anode to cathode; and
a second current flow path permitting current flow in a second direction from the output to the input, the second current flow path coupled in parallel with the first current flow path and including a second plurality of semiconductor switching devices each including an anode and a cathode and wherein each of the second plurality of semiconductor switching devices is coupled together anode to cathode;
wherein the first current flow path and the second current flow path each include sets of passive devices coupled in parallel with respective ones of the first plurality of semiconductor switching devices and the second plurality of semiconductor switching devices and structured to provide energy absorption and voltage clamping when the semiconductor switching devices are turned off to open the utility disconnect switch, and to provide static and dynamic voltage balancing across the semiconductor devices.

17. The utility disconnect switch of claim 16 wherein the sets of passive devices comprise a surge arrester structured to provide energy absorption and voltage clamping, an RC snubber structured to provide dynamic voltage balancing, and a balancing resistor structured to provide static voltage balancing.

18. The utility disconnect switch of claim 16 wherein the first plurality of semiconductor devices and the second plurality of semiconductor switching devices are common to both the first current flow path and the second current flow path.

19. The utility disconnect switch of claim 16 wherein the first plurality of semiconductor switching devices and the second plurality of semiconductor switching devices structured in an anti-parallel relationship.

20. The utility disconnect switch of claim 16 wherein the first current flow path and the second current flow path each include a plurality of diodes connected in series with the plurality of semiconductor switching devices.

21. The utility disconnect switch of claim 20 further comprising a plurality of RC snubbers coupled in parallel corresponding ones of the plurality of diodes and a plurality of balancing resistor coupled in parallel with corresponding ones of the plurality of diodes.

22. The utility disconnect switch of claim 20 wherein the utility disconnect switch is provided in an uninterruptable power supply including an input line connected to the utility disconnect switch, and output line connected to the utility disconnect switch, and a secondary power supply connected to the output line.

23. A method comprising:
operating a power supply system comprising an input line structured to receive electric power from a utility, an output line structured to provide electric power to a load, a backup power supply operatively coupled with the output line, and a utility disconnect switch (UDS) including a first current path coupled between the input line and the output line and including a first plurality of semiconductor devices coupled each including an anode and cathode, wherein each of the first plurality of semiconductor devices is coupled together anode to cathode, and a second current path coupled in parallel with at least a portion of the first current path and including a second plurality of semiconductor devices each including an anode and cathode and wherein each of the second plurality of semiconductor devices is coupled together anode to cathode, the UDS being structured to selectably connect and disconnect the input line from the output line;
controlling the UDS to open a semiconductor switching device effective to disconnect the input line from the output line;
arresting a voltage surge in the UDS during the act of controlling;
clamping a maximum voltage of the USD to a maximum voltage during the act of controlling the UDS;
balancing a static voltage across the semiconductor switching device during the act of controlling the UDS; and balancing a dynamic voltage across the semiconductor switching device during the act of controlling the UDS.

24. The method of claim 23 wherein the acts of arresting a voltage surge and clamping a maximum voltage of the USD are performed by a single device.

25. The method of claim 24 wherein the single device comprises a varistor coupled in parallel with the semiconductor switching device.

26. The method of claim 23 wherein the act of balancing a static voltage across the semiconductor switching device is performed by a balancing resistor coupled in parallel with the semiconductor switching device.

27. The method of claim 23 wherein the act of balancing a dynamic voltage across the semiconductor switching device is performed by an RC snubber coupled in parallel with the semiconductor switching device.

28. The method of claim 23 wherein the act of controlling the UDS to open a semiconductor switching device comprises controlling to the UDS to open a plurality of semiconductor switching devices.

29. The method of claim 28 wherein the acts of arresting a voltage surge, clamping a maximum voltage, balancing a static voltage, and balancing a dynamic voltage are performed for each of the plurality of semiconductor switching devices.

* * * * *